May 25, 1937. F. SÜBERKRÜB 2,081,649
PADDLE WHEEL PROPELLER FOR SHIPS
Filed July 26, 1935
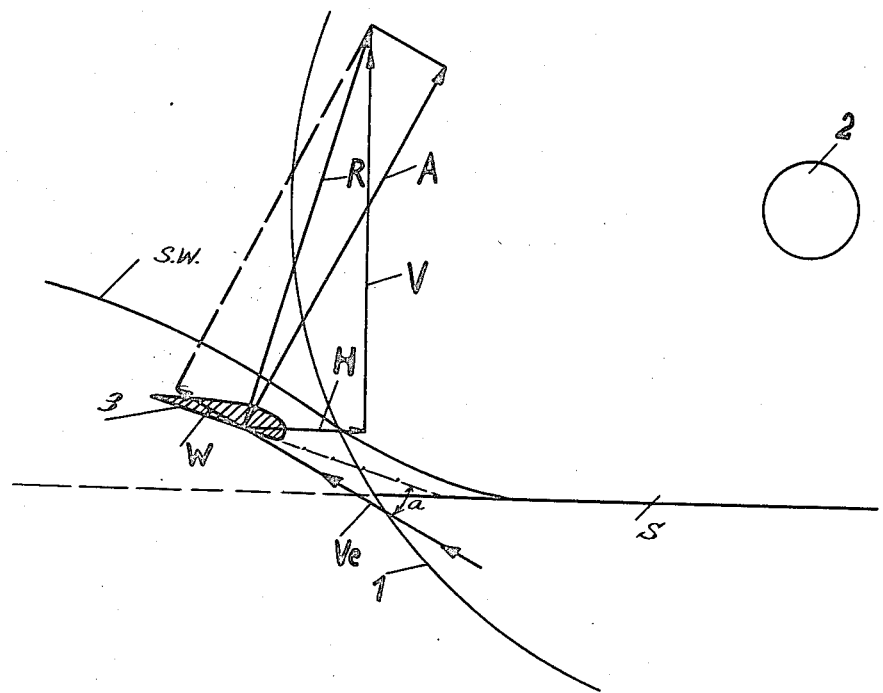

Patented May 25, 1937

2,081,649

UNITED STATES PATENT OFFICE 2,081,649

PADDLE WHEEL PROPELLER FOR SHIPS

Franz Süberkrüb, Hamburg, Germany

Application July 26, 1935, Serial No. 33,381
In Germany August 1, 1934

1 Claim. (Cl. 115—0.5)

Propulsion of ships by engine power is normally effected by screw propellers or paddle wheels which accelerate the flow of the surrounding water in a direction opposite to the direction of the ship's course.

Screw propellers are working normally entirely surrounded by one medium (water) only, while paddle wheels have paddles moving alternately through the water and through the air, i. e. in two different media. Of these the heavier medium, the water, is naturally the most effective and therefore decisive for the propulsion.

It is known that by paddle wheels, moving partly through the water partly through the air, when driving ships (especially towboats) a wave is formed behind the wheel which possesses certain characteristics. Height and form of this surface wave depend on the design of the wheel, the load on the paddles and the slip in the water, i. e. on the ratio between the circumferential speed of the wheel or paddles respectively and on the speed at which the ship moves through the water. Within this wave the water moves in a combined rearward and upward direction. This wave, i. e. the non-desired lifting of the weight of the water, is a constant loss for the propulsion of the ship as the necessary amount for lifting the water does not produce any propulsive thrust.

My invention refers to a paddle wheel drive with paddle wheels working partly in the water, partly in the air. The object of the invention is to regain a greater part of the loss of work contained in said wave by arranging a fin behind the paddle wheel, said fin having a profile similar to an aeroplane wing and being placed within said wave in such position that the rising water meets the lower side of said profile at a certain small angle and that the profile is on both its lower side and its upper side entirely surrounded by the water.

To explain the principle of my invention reference is made to the only figure of the accompanying drawing showing in principle in side elevation a paddle wheel propeller working on the sides respectively at the rear of a paddle wheel ship, the water surface and the wave formed behind the wheel when the paddle wheel is working being shown as well as a diagram of the forces, set free by the fin within said wave. The circumference 1 of a paddle wheel rotates in the direction of the arrow around a driving shaft 2 which is connected to the ship's engine. The wheel is partly immersed in the water, "S" designating the surface of the water when the ship is at rest. When the ship is moving, the wheel produces on its rear side the surface wave "SW". In the forward part of said wave the water moves in the direction of the arrow $ve$. A fin 3 within said wave behind the wheel and entirely surrounded by the streaming water is arranged parallel to the axle 2 of the wheel and has a profile similar to that of an aeroplane wing with a well rounded entering edge and is fastened to the ship and/or respectively to the bearer bars of the wheel. The underside of profile 3 forms a small angle $\alpha$ with the direction of the streamlines of the water moving in the direction $ve$ relative to the underside of the profile.

Due to the position of the profile, its shape and the angle $\alpha$, the kinetic energy contained in the water produces on the profile the reactions W and A, of which W is the resistance of the profile measured in the direction $ve$ while A is the lifting force produced on the profile measured in a direction at right angles to $ve$ respectively to W. W and A are the forces usually measured at wind-channel tests of aeroplane profiles and they are nearly correct as the ratio of their mutual lengths. Size and ratio of W and A are of course greatly depending on the profile of the fin 3, the angle and the kinetic energy contained in the water. On the other hand it is known that the same laws which apply to moving air on aeroplane wings are also valid when such aeroplane wing profile is entirely immersed in the one medium "water".

The diagram shows that for the component forces W and A their combined resultant force R may be substituted which in turn may be divided into the component forces H and V. V designates a vertical lifting power produced on the wing by the action of the water, whereas H is a horizontal force in the direction of the ship's course and therefore an addition to the propulsive thrust of the ship.

It follows therefrom that a suitably shaped profile 3 correctly placed within the surface wave SW regains part of the loss of work otherwise caused by the lifting of the water. As the profile and the shape of the waves, seen in side elevation of the ship, are changing with changing conditions of draught, travelling speed and the like, it is advisable in certain cases to provide for arrangements by which the position of the fin with respect to the wheel and its angle $\alpha$ and with respect to the direction of movement of the water $ve$ may be altered as circumstances demand so as to produce always a maximum of additional thrust H of the profile.

What I claim is:

In combination with a paddle wheel propeller of a ship having its paddles working alternately through the water and through the air, a fin behind said paddle wheel, having the profile of an aeroplane wing, said fin arranged parallel to the axis of said paddle wheel and fastened to the ship's hull at a place entirely within the surface wave formed behind the wheel when the wheel is rotating and in such angular position, that the underside of the profile opposes the upward and rearward moving water in the front part of said surface wave at a small angle.

FRANZ SÜBERKRÜB.